US010267513B2

(12) United States Patent
Huang et al.

(10) Patent No.: US 10,267,513 B2
(45) Date of Patent: Apr. 23, 2019

(54) SWITCHING DEVICE OF GAS VALVE

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 153 days.

(21) Appl. No.: 15/644,473

(22) Filed: Jul. 7, 2017

(65) Prior Publication Data

US 2018/0306436 A1    Oct. 25, 2018

(30) Foreign Application Priority Data

Apr. 21, 2017    (TW) .............................. 106113433 A

(51) Int. Cl.
*F16K 5/02*    (2006.01)
*F16K 5/10*    (2006.01)
(Continued)

(52) U.S. Cl.
CPC ................ *F23C 1/08* (2013.01); *F16K 5/02* (2013.01); *F16K 5/0214* (2013.01);
(Continued)

(58) Field of Classification Search
CPC ........ F16K 5/02; F16K 5/0214; F16K 5/0242; F16K 5/10; F16K 5/103; F16K 5/12;
(Continued)

(56) References Cited

U.S. PATENT DOCUMENTS 8,083,208 B2 *    12/2011    Li .......................... F23N 1/007
                                                        251/207
2009/0181336 A1 *    7/2009    Huang .................. F16K 5/0207
                                                        431/278
(Continued)

FOREIGN PATENT DOCUMENTS

CN        105351556 A       2/2016
TW           472853 U       1/2002
(Continued)

OTHER PUBLICATIONS

Examination report for TW106113433, dated Aug. 8, 2017, Total of 7 pages.
(Continued)

*Primary Examiner* — Kevin F Murphy
*Assistant Examiner* — Kelsey E Cary
(74) *Attorney, Agent, or Firm* — Lynette Wylie; Apex Juris, Pllc.

(57) ABSTRACT

A switching device includes a rod, a rotating shaft, and a valve assembly including a cover and a plug member. The cover engaged with the valve body has a first block section, a second block section, a space, and a threaded hole communicates with the space. The plug member is rotatably provided in a chamber of the cover, changing an area of an opening of an inlet hole. The rotating shaft has a projection is adapted to drive the plug member to rotate. A rod body of the rod has a threaded section engaged with the threaded hole. When the projection abuts against the first block section, the plug member seals the inlet hole. When the projection abuts against the rod, the plug member changes the area to a first area. When the projection abuts against the second block section, the plug member changes the area to a second area.

10 Claims, 13 Drawing Sheets

| | | | | |
|---|---|---|---|---|
| (51) | Int. Cl. | | (56) | References Cited |
| | *F16K 5/00* | (2006.01) | | |
| | *F23C 1/08* | (2006.01) | | U.S. PATENT DOCUMENTS |
| | *F16K 5/12* | (2006.01) | | |
| | *F23N 1/00* | (2006.01) | | |
| | *F23K 5/00* | (2006.01) | | |
| | *F24C 3/10* | (2006.01) | | |
| | *F24C 3/12* | (2006.01) | | |
| | *F24C 5/16* | (2006.01) | | |

(51) Int. Cl.
  *F16K 5/00* (2006.01)
  *F23C 1/08* (2006.01)
  *F16K 5/12* (2006.01)
  *F23N 1/00* (2006.01)
  *F23K 5/00* (2006.01)
  *F24C 3/10* (2006.01)
  *F24C 3/12* (2006.01)
  *F24C 5/16* (2006.01)

(52) U.S. Cl.
  CPC .............. *F16K 5/0242* (2013.01); *F16K 5/10* (2013.01); *F16K 5/103* (2013.01); *F16K 5/12* (2013.01); *F23K 5/007* (2013.01); *F23N 1/00* (2013.01); *F23N 1/007* (2013.01); *F24C 3/10* (2013.01); *F24C 3/12* (2013.01); *F24C 5/16* (2013.01); *F23K 2900/05002* (2013.01); *F23N 2035/24* (2013.01)

(58) Field of Classification Search
  CPC .... F23K 5/007; F23N 1/00; F23C 1/08; F24C 3/10; F24C 3/12; F24C 5/16
  USPC .... 251/207, 129.12, 209, 284, 288, 312, 89, 251/285
  See application file for complete search history.

(56) References Cited

U.S. PATENT DOCUMENTS

2010/0154777 A1   6/2010  Carvalho et al.
2014/0252253 A1*  9/2014  Huang .................. F16K 5/0214
                                                                            251/121
2015/0377380 A1  12/2015  Li

FOREIGN PATENT DOCUMENTS

TW         M289839 U     4/2006
TW         M341813 U     10/2008

OTHER PUBLICATIONS

Search report for TW106113433, dated Aug. 3, 2017, Total of 1 page.
English Abstract of CN105351556 (A), Total of 1 page.
English Abstract of TW472853 (U), Total of 1 page.
English Abstract of TWM289839 (U), Total of 1 page.
English Abstract of TWM341813 (U), Total of 1 page.

* cited by examiner

SWITCHING DEVICE OF GAS VALVE

BACKGROUND OF THE INVENTION

1. Technical Field

The present invention generally relates to a stove, and more particularly to a switching device of a gas valve for natural gas and liquefied petroleum gas.

2. Description of Related Art

Conventional stoves such as gas stoves or barbecue grills can be divided into two types based on which kind of gas they use, including natural gas and liquefied petroleum gas. The difference between the two types of stoves is the size of the gas passage of the gas switch. More specifically, the size of the gas passage of the gas switch for natural gas is greater than the size of the gas passage of the gas switch for liquefied petroleum gas. If a gas switch for natural gas is connected to use liquefied petroleum gas, the gas flow would be too large, causing incomplete combustion. On the contrary, if a gas switch for liquefied petroleum gas is connected to use natural gas, the resultant flames would be too weak.

Therefore, stove suppliers have to prepare two types of stoves at the same time to meet different requirements, which may cause unnecessary inventory pressure. In all aspects, the conventional gas switch still has room for improvements.

BRIEF SUMMARY OF THE INVENTION

In view of the above, one objective of the present invention is to provide a switching device for a gas valve, which could apply to natural gas and liquefied petroleum gas.

The present invention provides a switching device for a gas valve, including a valve assembly, a rotating shaft, a supporting base, and a rod. The valve assembly includes a valve body, a cover, and a plug member, wherein the valve body has an inlet hole, an outlet hole, and a chamber respectively communicating with the inlet hole and the outlet hole. The cover is engaged with the valve body, and has a first block section and a second block section, which both correspond to the chamber. A space is formed between the first block section and the second block section. The cover has a threaded hole communicating with the space and an outside of the cover. The plug member is rotatably provided in the chamber for changing an area of an opening of the inlet hole. The rotating shaft has a projection located in the space, wherein an end of the rotating shaft passes through the cover, and is connected to the plug member for driving the plug member to rotate. The supporting base is engaged with the valve assembly. The rod has a rod body and a threaded section, wherein the rod body passes through the supporting base. The threaded section is engaged with the threaded hole of the cover; the rod is able to be driven to enter or leave the space. When the rod enters the space, the projection moves between the first block section and the rod, whereby to restrict a rotated distance of the plug member as a first distance. When the rod leaves the space, the projection moves between the first block section and the second block section, whereby to restrict a rotated distance of the plug member as a second distance, wherein the second distance is greater than the first distance. When the projection abuts against the rod, the plug member changes the area of the opening of the inlet hole to a first area; when the projection abuts against the second block section, the plug member changes the area of the opening of the inlet hole to a second area, wherein the second area is smaller than the first area.

By changing the area of the opening of the inlet hole, the switching device of the gas valve could be adapted to be connected to natural gas or liquefied petroleum gas. In addition, the rod could be prevented from being disengaged from the supporting base.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
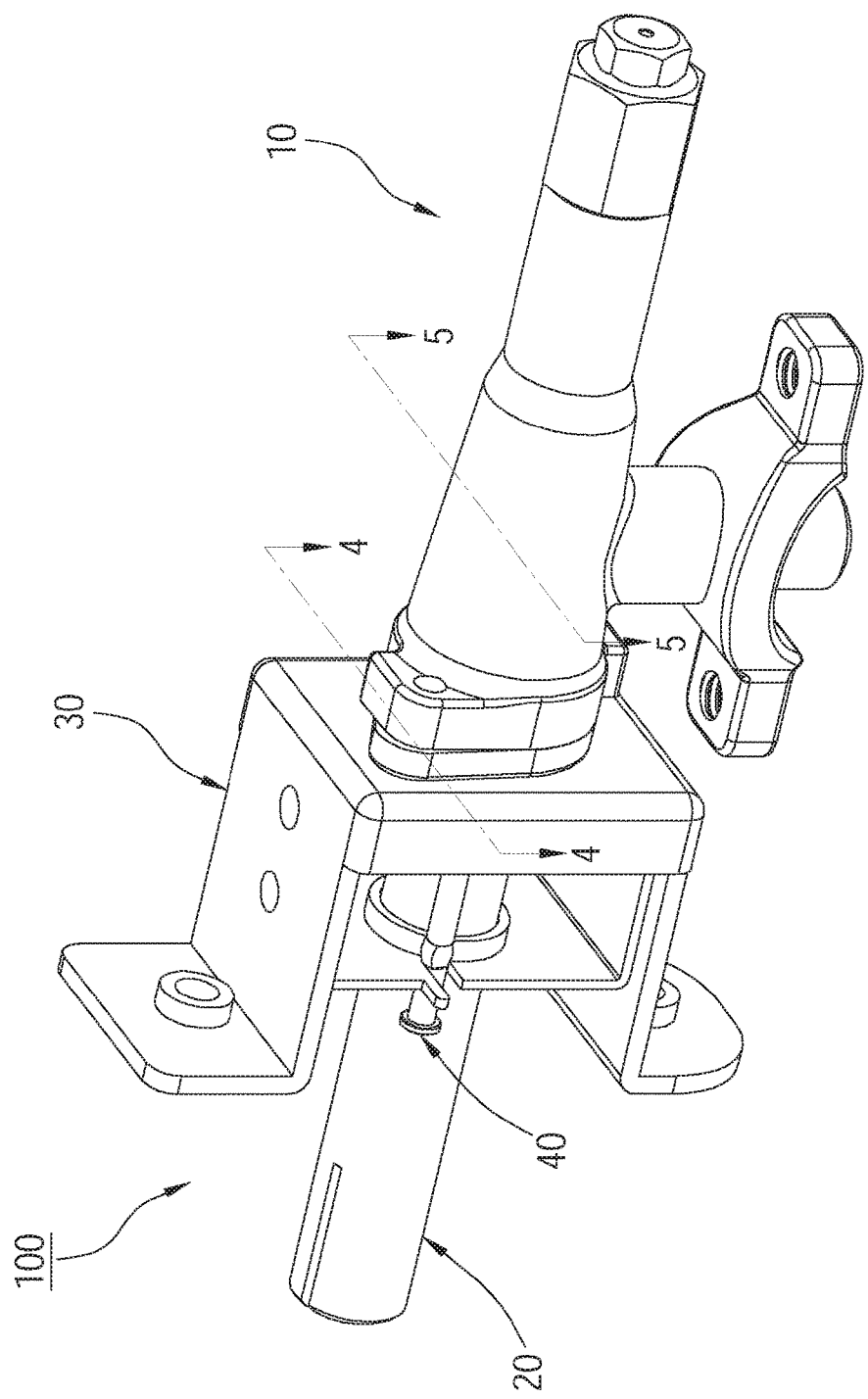
FIG. 1 is a perspective view of the switching device of an embodiment of the present invention for the gas valve.
Figure 2:
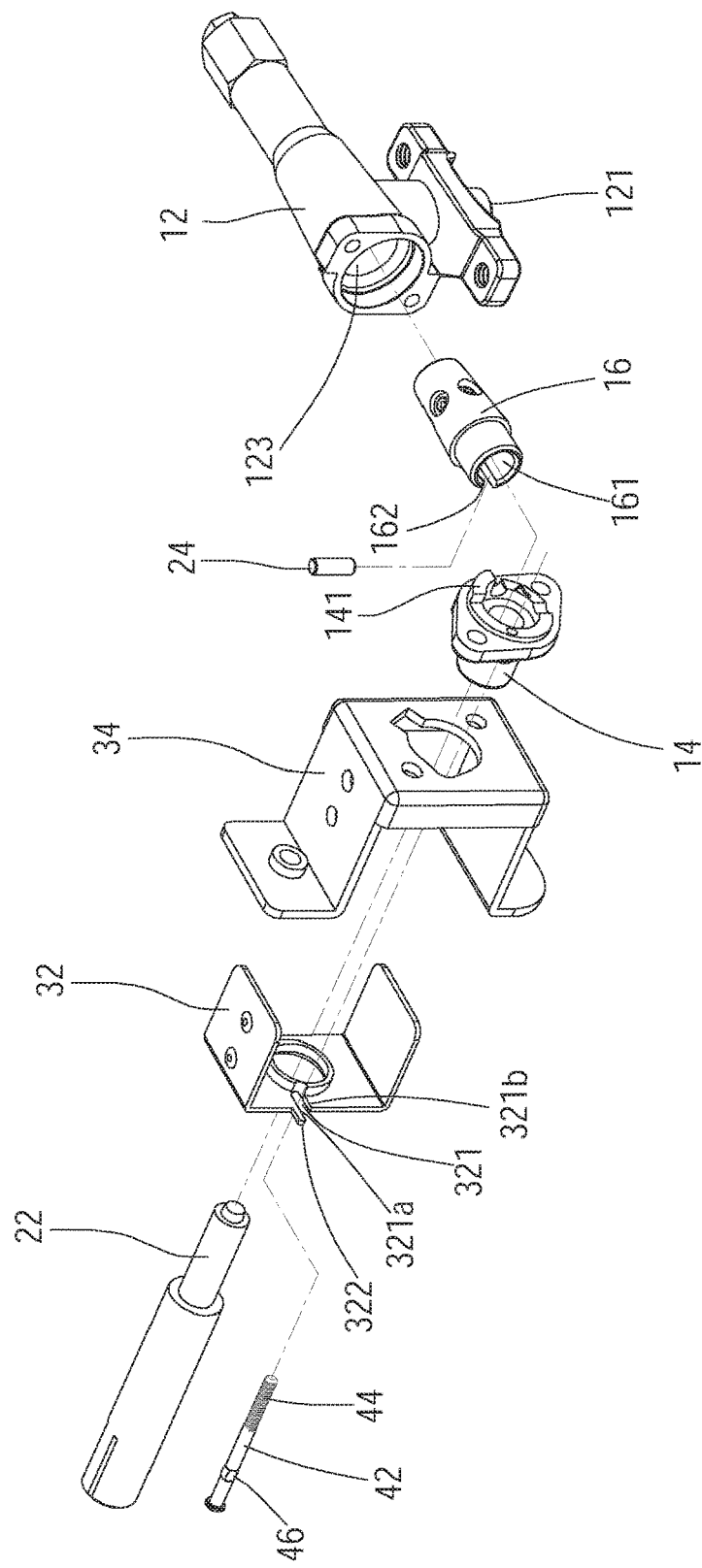
FIG. 2 is an exploded view of the switching device of the embodiment of the present invention.
Figure 3:
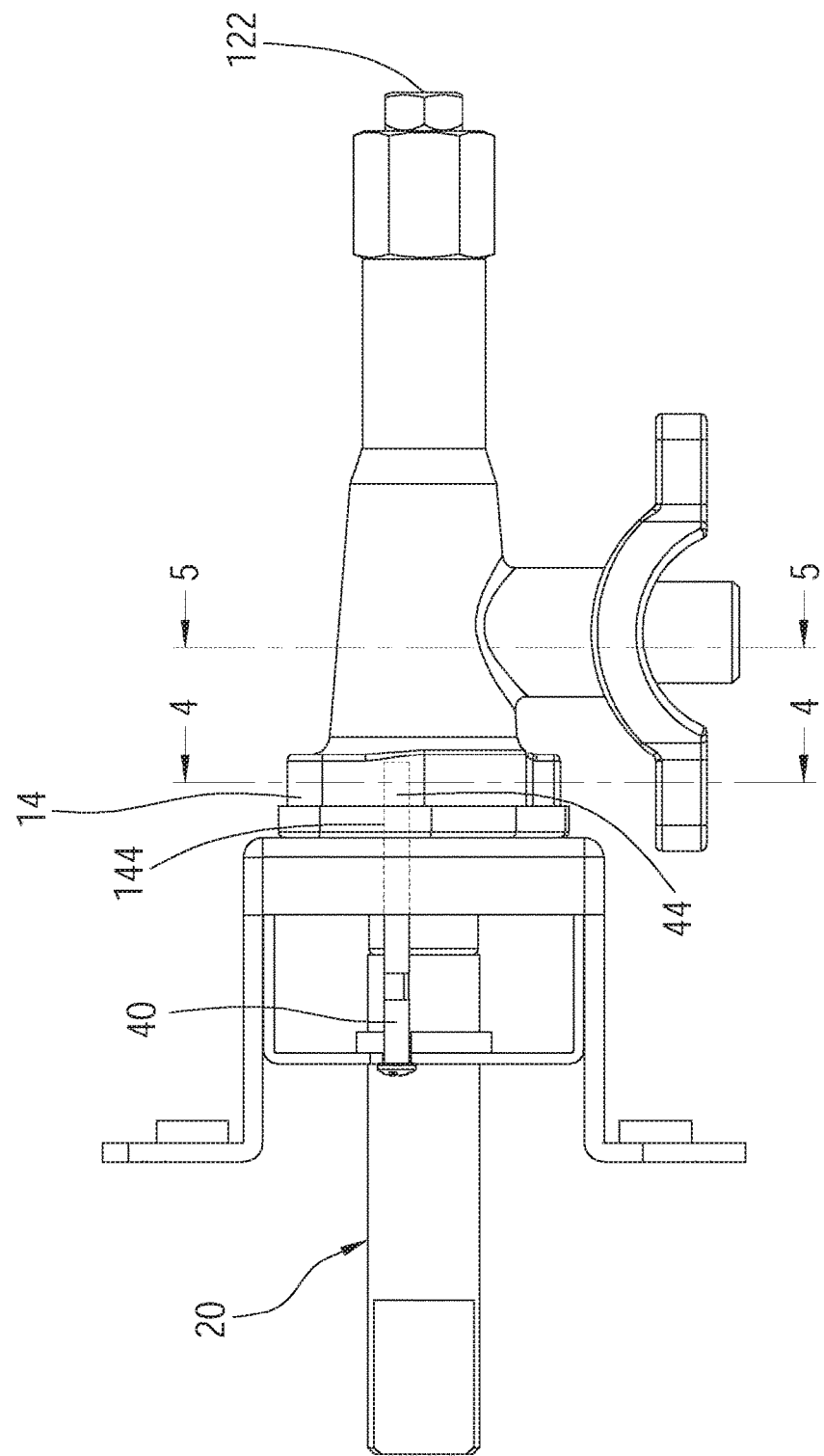
FIG. 3 is a side view of the switching device of the embodiment of the present invention, showing the rod is driven to enter the space.

As illustrated in FIG. 1 to FIG. 3, a switching device 100 of an embodiment of the present invention for a gas valve includes a valve assembly 10, a rotating shaft 20, a supporting base 30, and a rod 40.

The valve assembly 10 includes a valve body 12, a cover 14, and a plug member 16, wherein the valve body 12 has an inlet hole 121, an outlet hole 122, and a chamber 123. Gas could flow into the valve body 12 via the inlet hole 121, and could flow out of the valve body 12 via the outlet hole 122. The chamber 123 respectively communicates the inlet hole 121 and the outlet hole 122.

Figure 4:
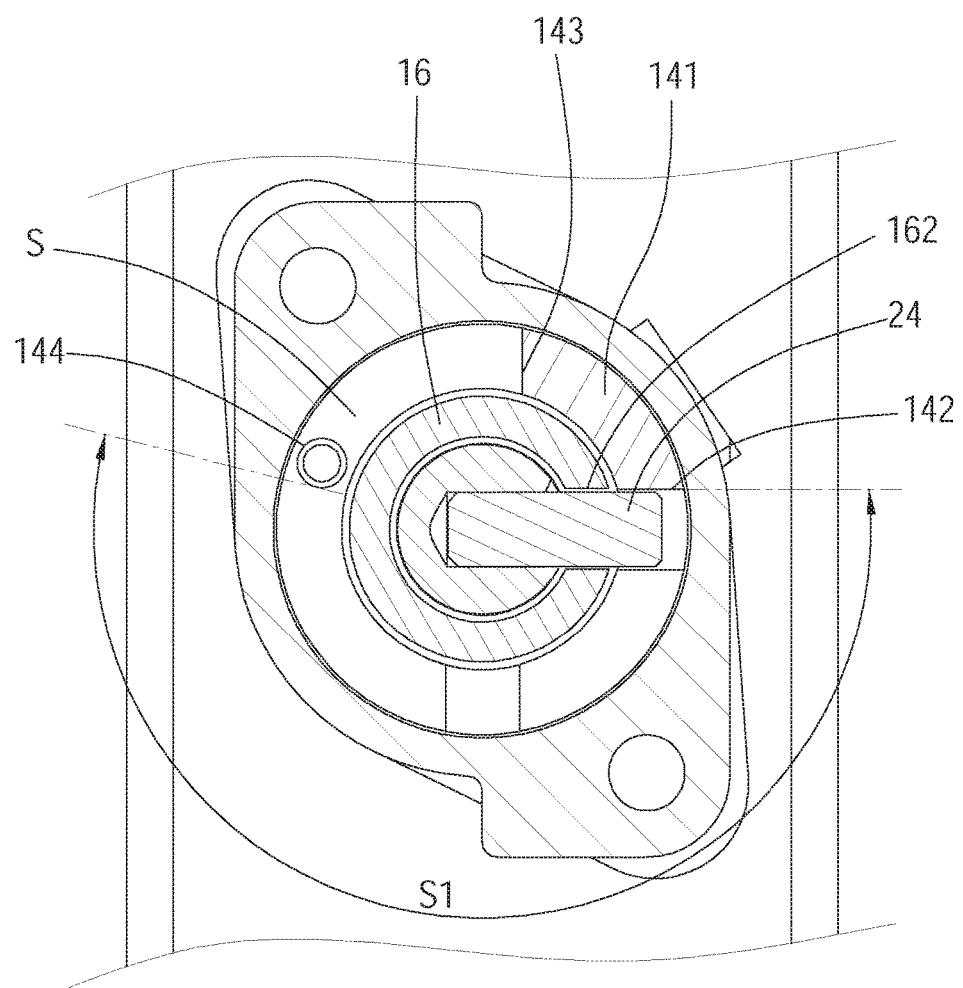
FIG. 4 is a sectional view along the 4-4 line in FIG. 1, showing the positioning member abuts against the first block section.

The cover 14 is engaged with an end of the valve body 12, and has a block 141 projecting from an outer surface of the cover 14. The block 141 is provided corresponding to the chamber 123, and has a first block section 142 and a second block section 143, wherein a space S for rotating is formed between the first block section 142 and the second block section 143, as shown in FIG. 4. In addition, the cover 14 further has a threaded hole 144 communicating with the space S and outside of the cover 14.

The plug member 16 is rotatably provided in the chamber 123 of the valve body 12 for changing an area of an opening of the inlet hole 121, and has an axial hole 161, a first hole 16a, a second hole 16b, a third hole 16c, and a notch 162. The axial hole 161 is located in an axial direction of the plug member 16. The first hole 16a, the second hole 16b, and the third hole 16c all communicate with the axial hole 161, and are located in a radial direction of the plug member 16. The notch 162 is located at an end of the plug member 16. The axial hole 161 communicates with the outlet hole 122 of the valve body 12. A diameter of the first hole 16a is greater than a diameter of the second hole 16b, and a diameter of the third hole 16c is smaller than the diameter of the first hole 16a and the diameter of the second hole 16b. The first hole 16a, the second hole 16b, and the third hole 16c are located along a rotating path, wherein the rotating path passes through the inlet hole 121. In this way, when the plug member 16 rotates, the area of the opening of the inlet hole 121 could vary through the variation of the diameters of the first hole 16a, the second hole 16b, and the third hole 16c, restricting the gas flow passing through the inlet hole 121 of the valve body 12.

The rotating shaft 20 includes a shaft body 22 and a positioning member 24, wherein an end of the shaft body 22 enters the axial hole 161 of the plug member 16 through the cover 14. The positioning member 24 is fixed at an end of the shaft body 22 and forms a projection of the rotating shaft 20. The positioning member 24 passes through the notch 162 of the plug member 16 to be located in the space S. When the rotating shaft 20 rotates under a force, the plug member 16 would be driven to rotate synchronously via the positioning member 24.

The supporting base 30 includes a plate 32 and a seat 34, wherein the seat 34 is engaged with the valve assembly 10. The plate 32 is connected to the seat 34, and has a slot 321 and a protrusion 322, wherein the slot 321 is recessed into a lateral edge of the plate 32, and has an upper wall 321a and a lower wall 321b, which are provided on opposite sides. The protrusion 322 protruding from the lateral edge of the plate 32 is near the slot 321 and is connected to the upper wall 321a.

The rod 40 has a rod body 42, a threaded section 44 and a positioning portion 46 bulging from the rod body 42, wherein the rod 40 is detachably engaged with the supporting base 30 and the valve assembly 10. The rod 40 could enter the slot 321 by abutting the protrusion 322 first to be guided into the slot 321, whereby the rod 40 could be driven to enter or leave the space S.

The rod body 42 passes through the slot 321 of the plate 32. The threaded section 44 is engaged with the threaded hole 144 of the cover 14. The positioning portion 46 is located between the plate 32 and the valve assembly 10. In the current embodiment, the positioning portion 46 has a first width in a first radial direction thereof and a second width in a second radial direction thereof, wherein the first width is greater than a width of the slot 321, and the second width is smaller than the width of the slot 321. The second radial direction is perpendicular to the first radial direction. By restricting said widths, a distance that the rod 40 moving out of the space S could be confined, preventing the rod 40 from being disengaged from the supporting base 30.

Figure 5:
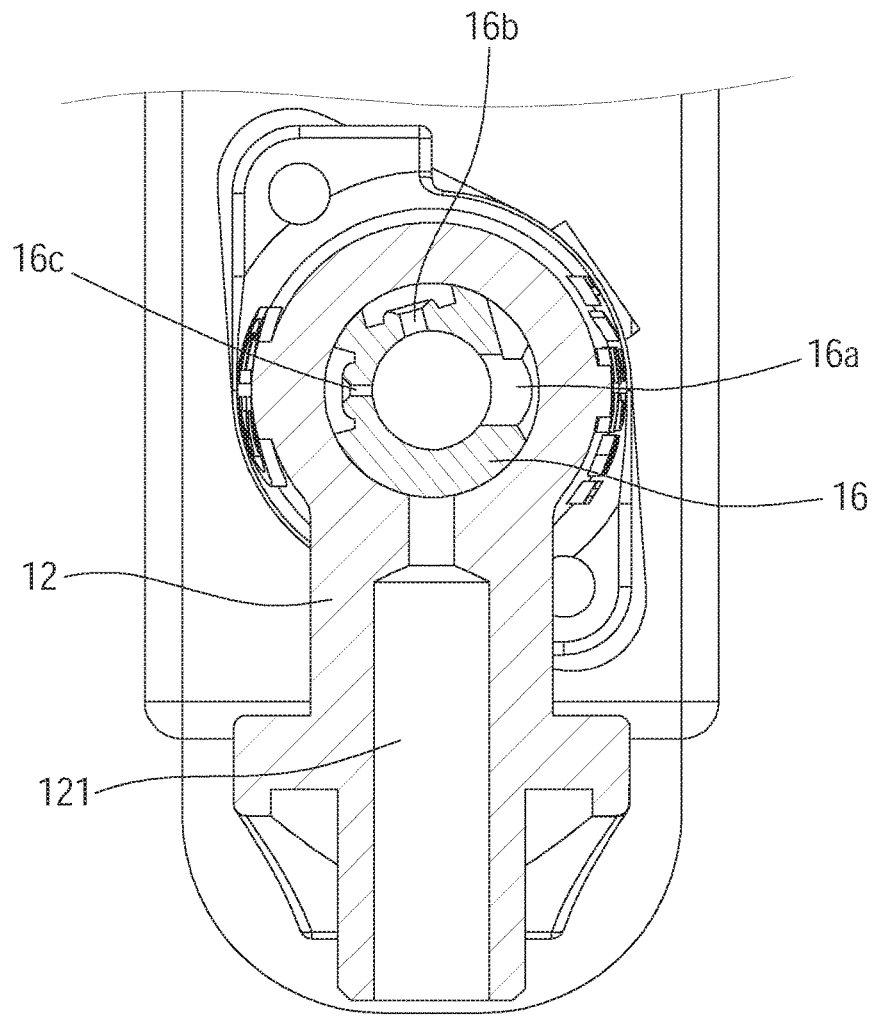
FIG. 5 is a sectional view along the 5-5 line in FIG. 1, showing the plug member seals the opening of the inlet hole.
Figure 6:
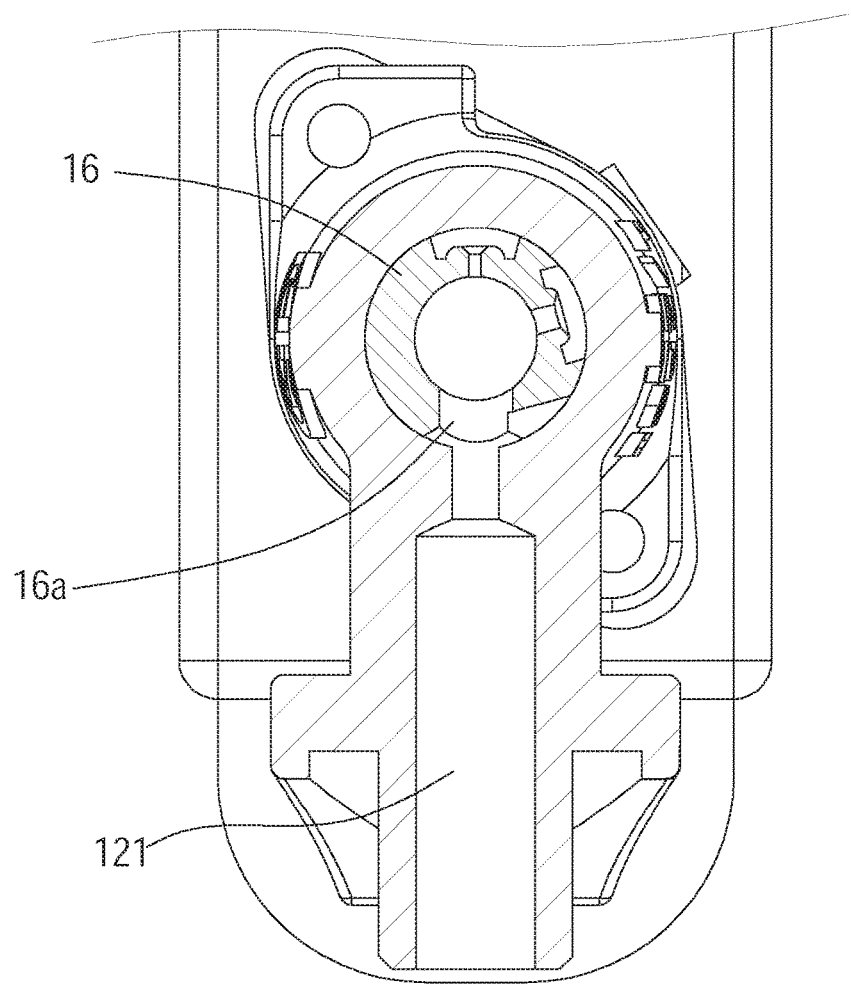
FIG. 6 is similar to FIG. 5, showing the plug member changes the area of the opening of the inlet hole to the maximum area.

When the rod 40 enters the space S, as shown in FIG. 3, the positioning member 24 of the rotating shaft 20 could move between the first block section 142 and the rod 40, whereby to restrict a rotated distance of the plug member 16 as a first distance S1, as shown in FIG. 4 and FIG. 5. When the positioning member 24 abuts against the first block section 142, an outer peripheral surface of the plug member 16 seals the inlet hole 121. Hence, gas could not pass through the inlet hole 121 and the axial hole 161 of the plug member 16, so as to turn off gas by the plug member 16. As shown in FIG. 6, when the positioning member 24 leaves the first block section 142, the first hole 16a of the plug member 16 would correspond to the inlet hole 121 first, to thereby to change the area of the opening of the inlet hole 121 to a maximum area.

Figure 7:
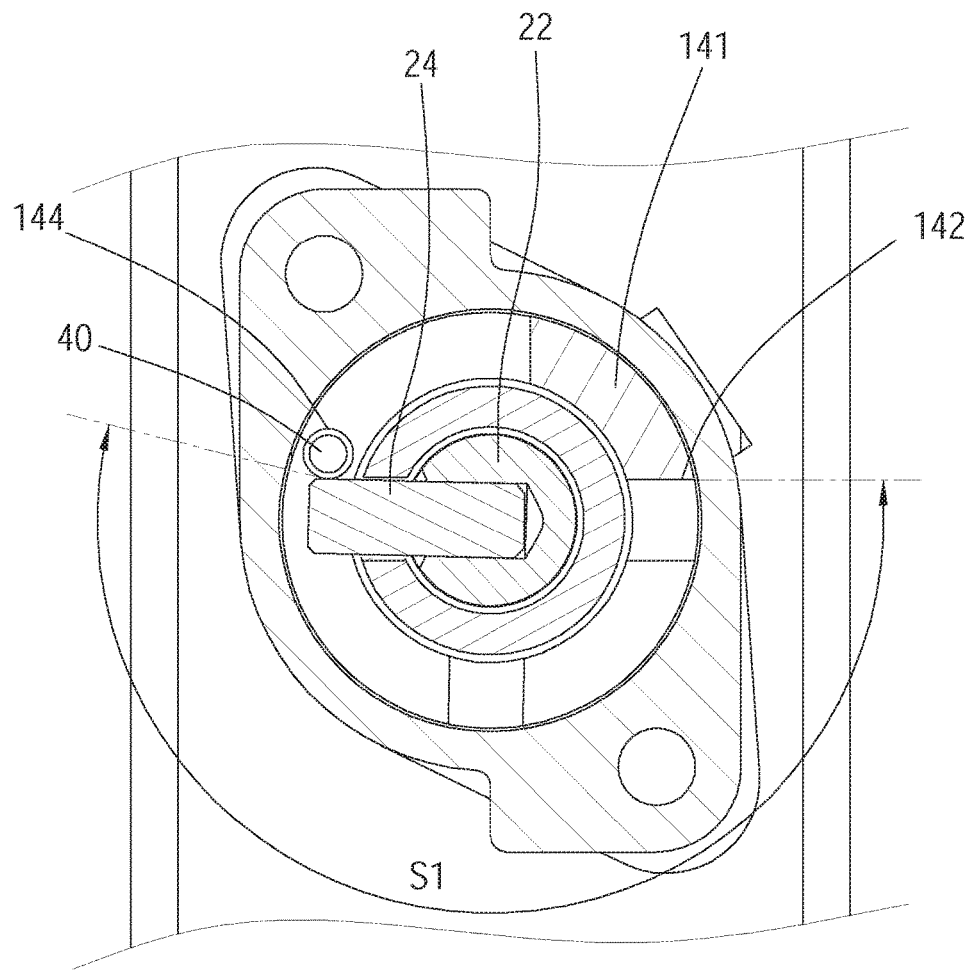
FIG. 7 is similar to FIG. 4, showing the positioning member abuts against the rod.
Figure 8:
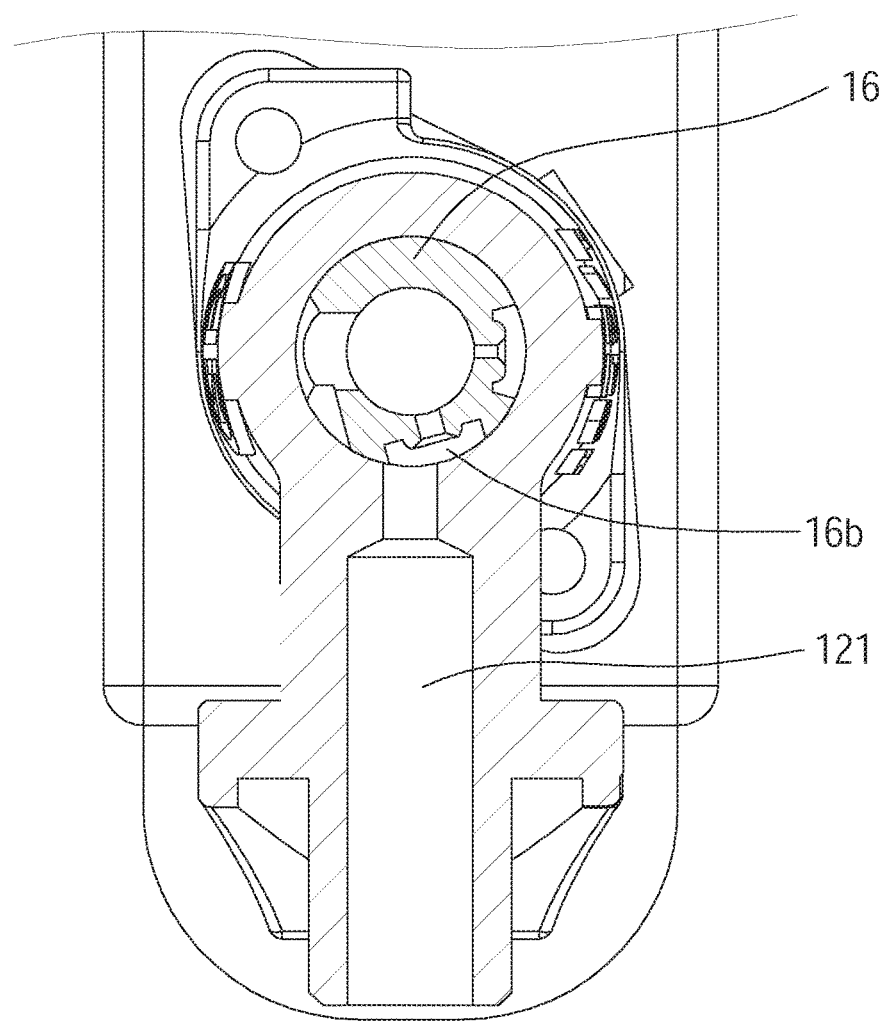
FIG. 8 is similar to FIG. 5, showing the plug member changes the area of the opening of the inlet hole to the first area.

As shown in FIG. 7 and FIG. 8, when the positioning member 24 abuts against the rod 40, the second hole 16b of the plug member 16 communicates with the inlet hole 121, whereby the plug member 16 changes the area of the opening of the inlet hole 121 to a first area, wherein the first area is smaller than the maximum area.

Figure 9:
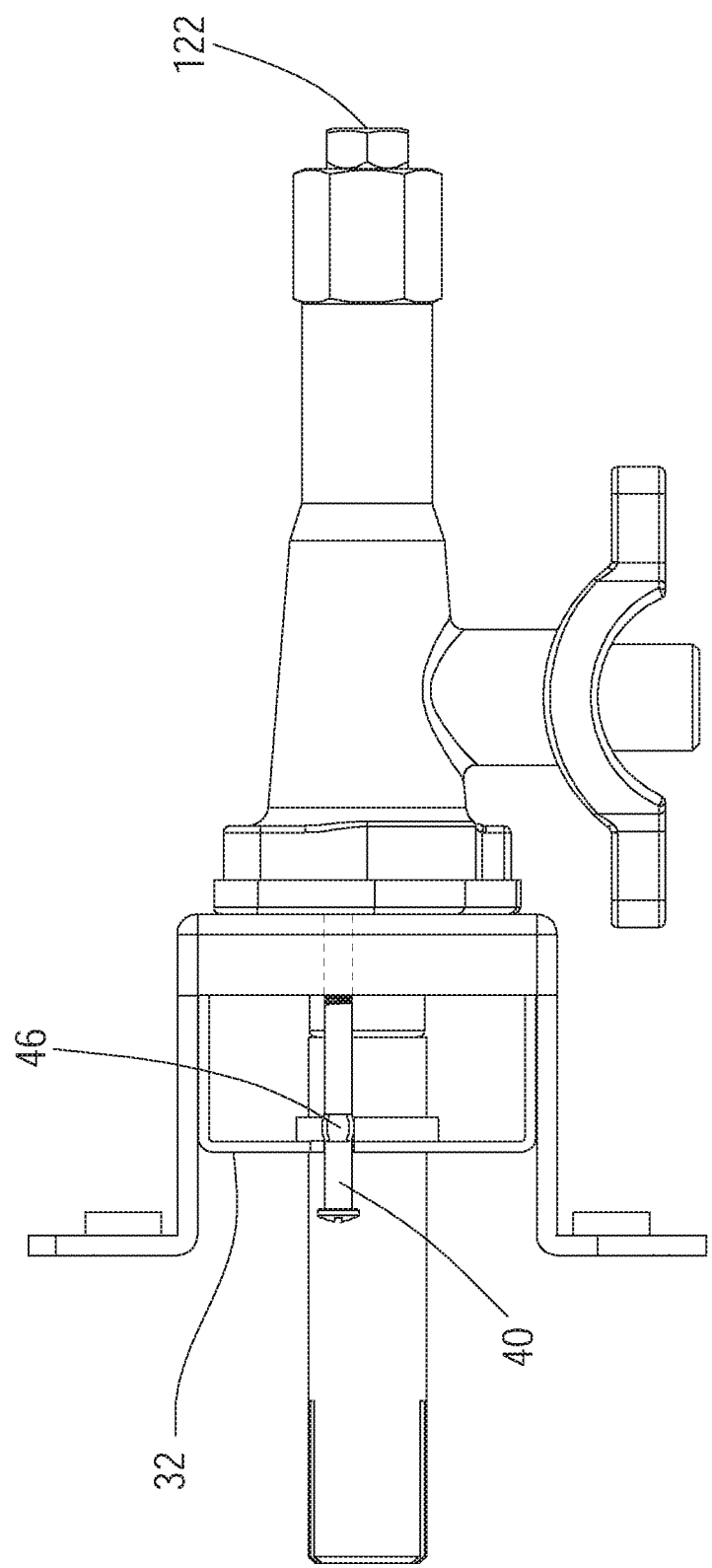
FIG. 9 is similar to FIG. 3, showing the rod does not enter the space.
Figure 10:
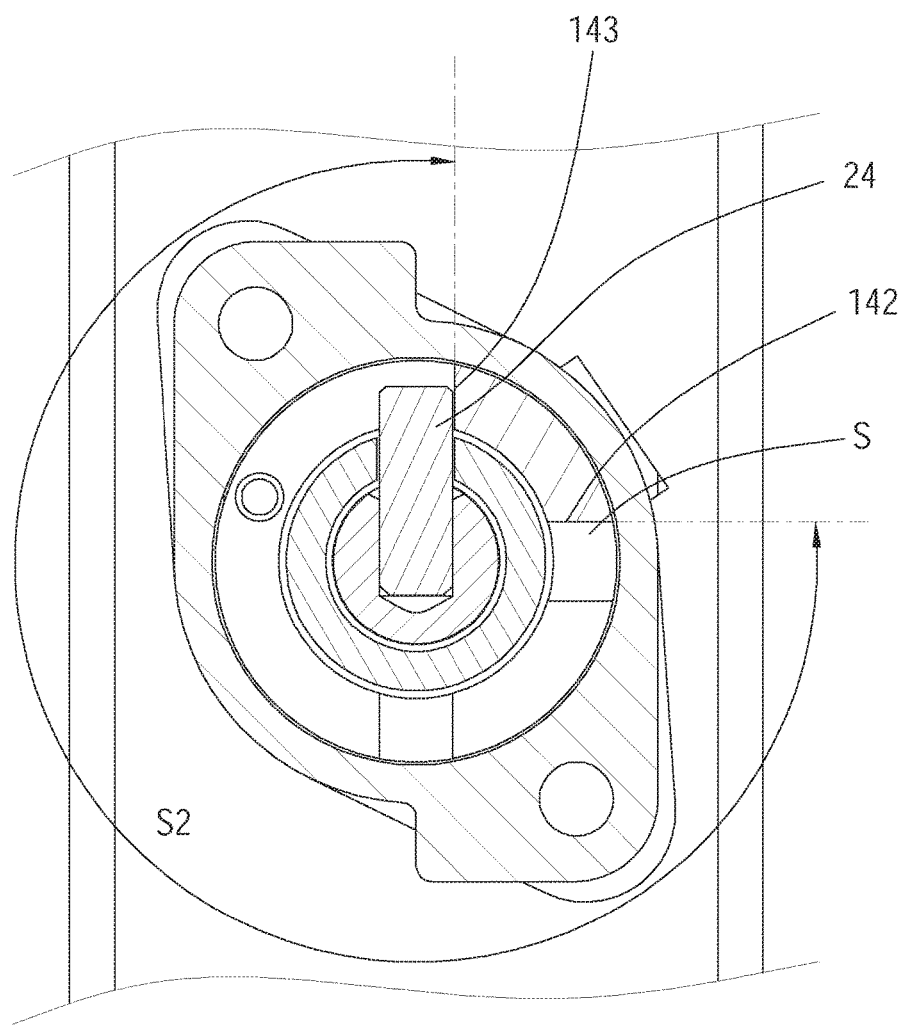
FIG. 10 is similar to FIG. 4, showing the positioning member abuts against the second block section.
Figure 11:
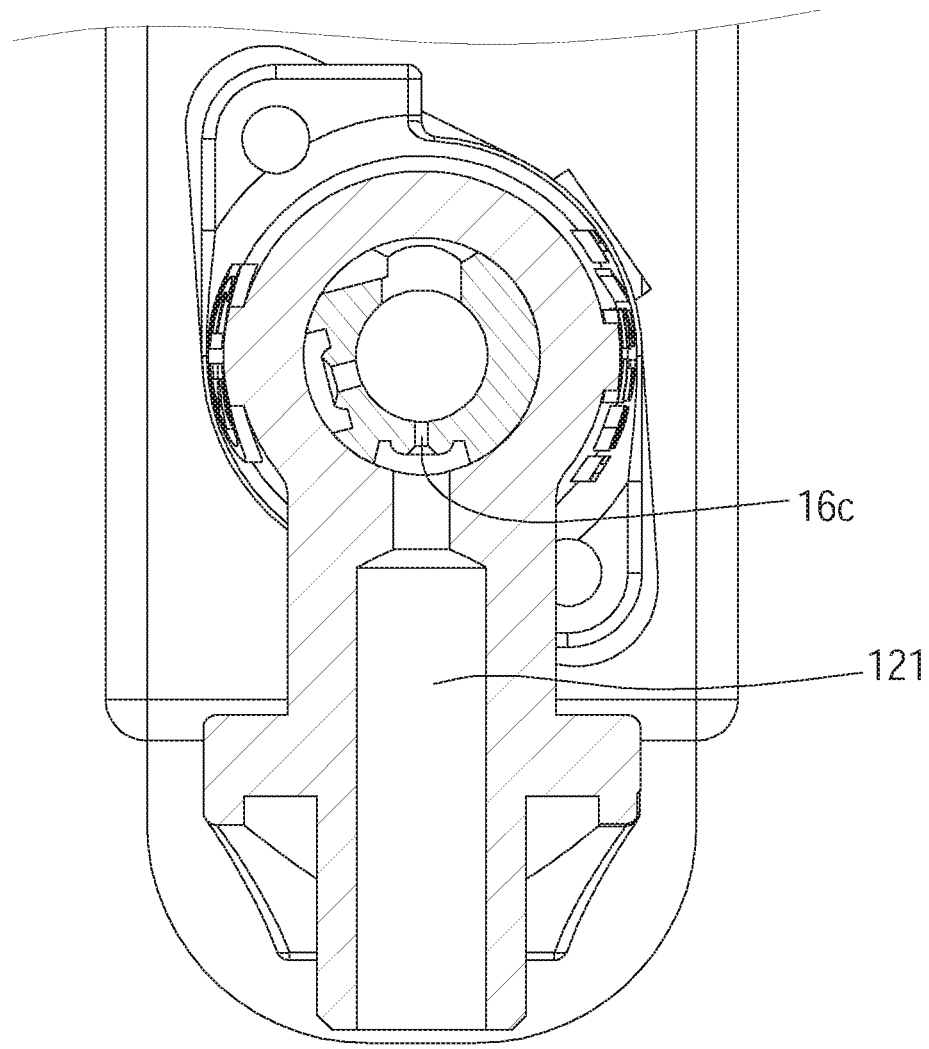
FIG. 11 is similar to FIG. 5, showing the plug member changes the area of the opening of the inlet hole to the second area.

As shown in FIG. 9 to FIG. 11, when the rod 40 leaves the space S, the positioning member 24 of the rotating shaft 20 could move between the first block section 142 and the second block section 143, whereby to restrict a rotated distance of the plug member 16 as a second distance S2, wherein the second distance S2 is greater than the first distance S1. When the positioning member 24 abuts against the second block section 143, the third hole 16c of the plug member 16 communicates with the inlet hole 121, whereby the plug member 16 changes the area of the opening of the inlet hole 121 to a second area, wherein the second area is smaller than the first area.

With the aforementioned design, when the rod 40 does not enter the space S, the area of the opening of the inlet hole 121 could vary between the first area and the second area. In such a condition, the inlet hole 121 of the valve body 12 is adapted for connecting liquefied petroleum gas. When the rod 40 enters the space S, the area of the opening of the inlet hole 121 could vary between the first area and the maximum area. In such a condition, the inlet hole 121 of the valve body 12 is adapted for connecting natural gas.

Figure 12:
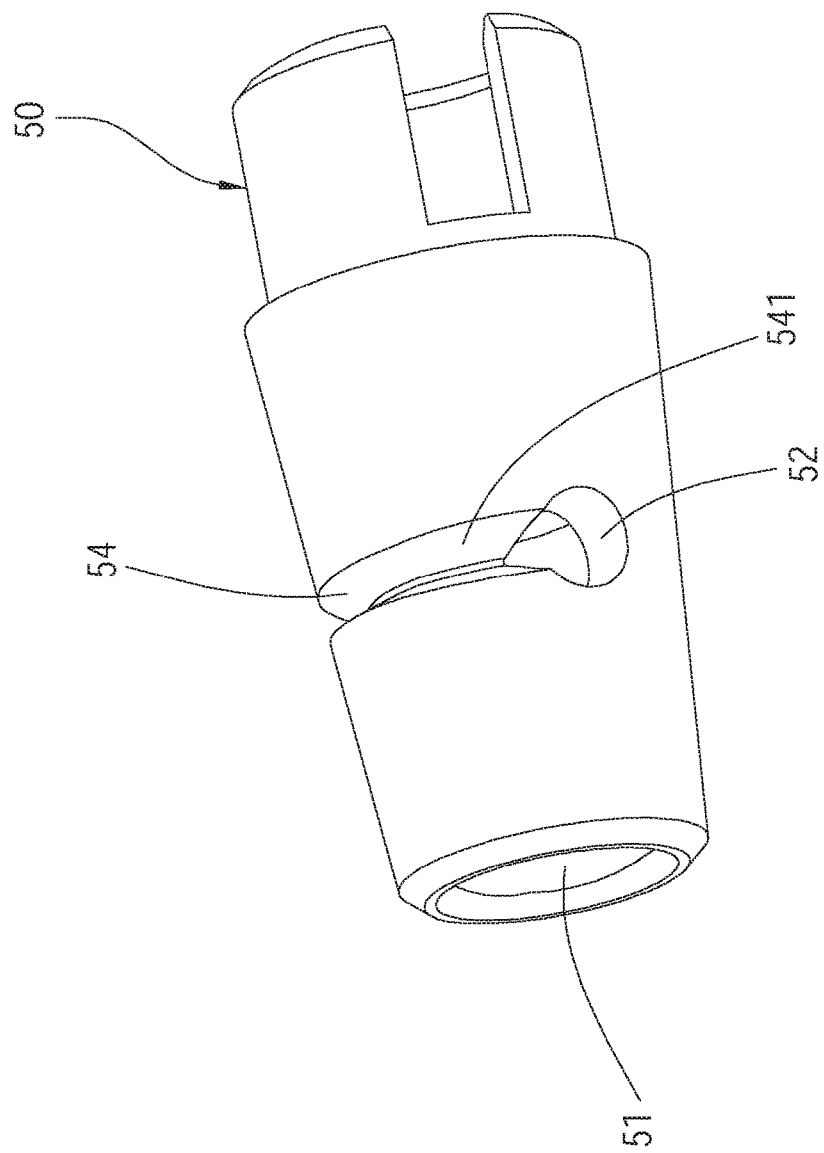
FIG. 12 is a perspective view, showing the structures of another plug member.
Figure 13:
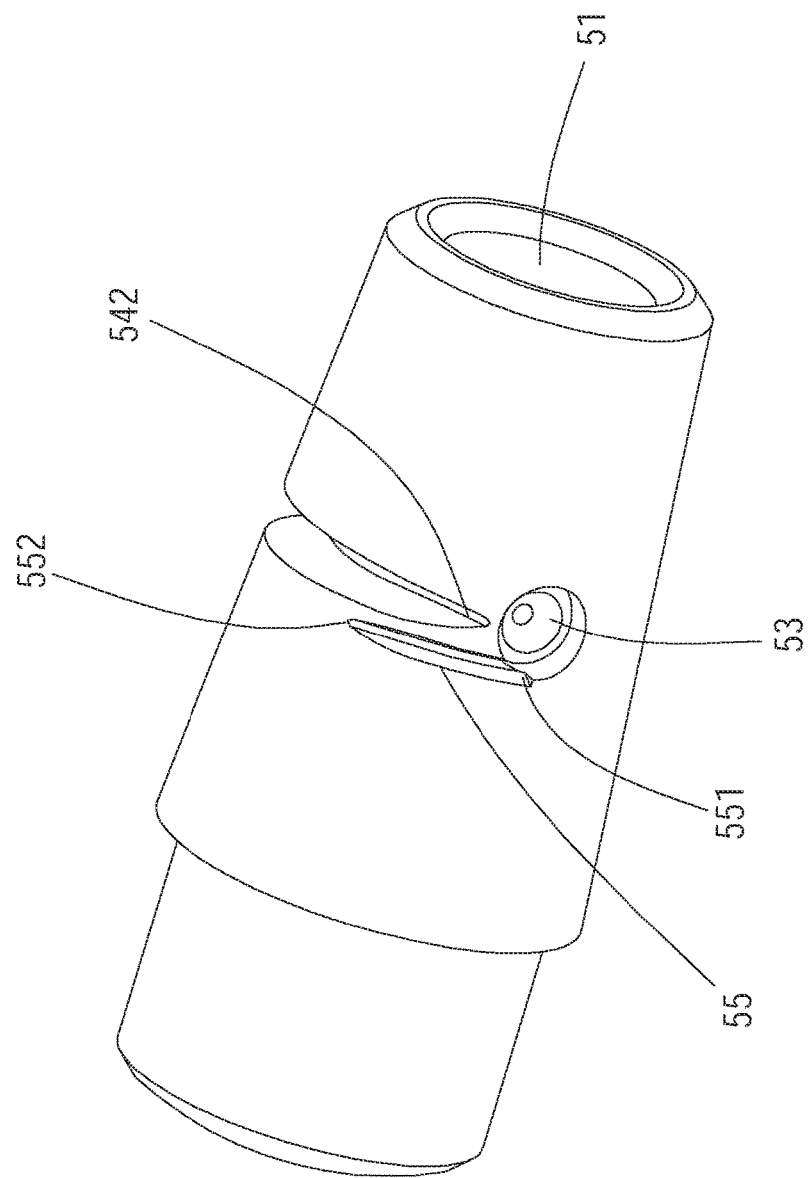
FIG. 13 is a perspective view, showing the structures of the plug member in FIG. 12.

However, the structures of the plug member which is adapted to change the area of the opening of the inlet hole are not a limitation of the present invention. A structure of another plug member 50 is illustrated in FIG. 12 and FIG. 13, wherein the plug member 50 could be provided in the chamber 123 of the valve body 12. The plug member 50 has an axial hole 51, a first hole 52, a second hole 53, a first guiding slot 54, and a second guiding slot 55, wherein the axial hole 51 is located in an axial direction of the plug member 50. The first hole 52 and the second hole 53 are located in a radial direction of the plug member 50. The first guiding slot 54 and the second guiding slot 55 are recessed into an outer peripheral surface of the plug member 50.

The first hole 52 and the second hole 53 respectively communicate with the axial hole 51. In the current embodiment, the first guiding slot 54 extends from the first hole 52 toward the second hole 53. The first guiding slot 54 has a first end 541 and a second end 542, wherein the first end 541 communicates with the first hole 52, and the second end 542 is near the second hole 53 without physically communicating with the second hole 53. A width of the first end 541 is greater than a width of the second end 542, wherein the width of the first guiding slot 54 decreases gradually from the first end 541 to the second end 542 to form a tip at the second end 542. A depth of the first guiding slot 54 decreases gradually from the first end 541 to the second end 542.

The second guiding slot 55 extends from the second hole 53 toward the first hole 52, and has a third end 551 and a fourth end 552, wherein the third end 551 communicates with the second hole 53, and the fourth end 552 is located between the first end 541 of the first guiding slot 54 and the second end 542 without physically communicating with the first guiding slot 54. Due to the difference between the diameter of the first hole 52 and the diameter of the second hole 53, and the variation of the widths of the first guiding slot 54 and the second guiding slot 55, the gas flow passing through the plug member 50 could be regulated while rotating the plug member 50. When the plug member 50 is rotated to a position that both the first guiding slot 54 and the second guiding slot 55 correspond to the inlet hole 121, gas would flow into the axial hole 51 of the plug member 50 via the first guiding slot 54 and the second guiding slot 55 synchronously, and would flow out of the valve body 12 via the outlet hole 122 of the valve body 12.

It is worth mentioning that, since both the second end 542 of the first guiding slot 54 and the fourth end 552 of the second guiding slot 55 are tips, the chance of accumulating too much lubricant in the second end 542 of the first guiding slot 54 or the fourth end 552 of the second guiding slot 55 could be reduced. Even when the second end 542 of the first guiding slot 54 and the fourth end 552 of the second guiding slot 55 have large amount of lubricant L accumulated therein, gas could still flow into the axial bore 51 of the plug member 50 through the second guiding slot 55 and the second hole 53, whereby the gas flow passing through the plug member 50 could be prevented from dropping dramatically or being cut off.

In summary, the switching device of the present invention could effectively limit the gas flow passing through the plug member by matching the rod with the space of the cover. More specifically, the switching device could be applied to natural gas and liquefied petroleum gas by simply driving the rod to enter or leave the space, and changing the position of the projection of the rotating shaft. In addition, the protrusion 322 of the plate 32 could guide the rod to enter the slot 321 along the protrusion 322. When the rod 40 is engaged with the supporting base 30, the distance that the rod 40 moving out of the space S could be confined by the plate 32, preventing the rod 40 from being disengaged from the supporting base 30. Furthermore, the switching device of the present invention allows both natural gas and liquid bottled gas being connected to the same stove, which can reduce unnecessary inventory pressure for the stove supplier and increase the convenience while installing the stove.

It must be pointed out that the embodiments described above are only some preferred embodiments of the present invention. All equivalent structures which employ the concepts disclosed in this specification and the appended claims should fall within the scope of the present invention.

What is claimed is:

1. A switching device for a gas valve, comprising:
   a valve assembly comprising a valve body, a cover, and a plug member, wherein the valve body has an inlet hole, an outlet hole, and a chamber respectively communicating with the inlet hole and the outlet hole; the cover is engaged with the valve body, and has a first block section and a second block section, which both correspond to the chamber; a space is formed between the first block section and the second block section; the cover has a threaded hole communicating with the space and an outside of the cover; the plug member is rotatably provided in the chamber for changing an area of an opening of the inlet hole;
   a rotating shaft having a projection located in the space, wherein an end of the rotating shaft passes through the cover, and is connected to the plug member for driving the plug member to rotate;
   a supporting base engaged with the valve assembly; and
   a rod having a rod body and a threaded section, wherein the rod body passes through the supporting base; the threaded section is engaged with the threaded hole of the cover; the rod is able to be driven to enter or leave the space;
   wherein, when the rod enters the space, the projection moves between the first block section and the rod, whereby to restrict a rotated distance of the plug member as a first distance; when the rod leaves the space, the projection moves between the first block section and the second block section, whereby to restrict a rotated distance of the plug member as a second distance, wherein the second distance is greater than the first distance; when the projection abuts against the rod, the plug member changes the area of the opening of the inlet hole to a first area; when the projection abuts against the second block section, the plug member changes the area of the opening of the inlet hole to a second area, wherein the second area is smaller than the first area.

2. The switching device of claim 1, wherein the supporting base comprises a plate; the rod body of the rod passes through the plate; the rod has a positioning portion bulging from the rod body; the positioning portion is located between the plate and the valve assembly; a distance that the rod moving out of the space is confined by the positioning portion.

3. The switching device of claim 2, wherein the plate has a slot; the rod passes through the slot, and is engaged with the threaded hole of the cover with the threaded section thereof.

4. The switching device of claim 3, wherein the positioning portion of the rod has a first width in a first radial direction of the positioning portion; the first width is greater than a width of the slot; the positioning portion has a second width in a second radial direction of the positioning portion; the second radial direction is perpendicular to the first radial direction; the second width is smaller than the width of the slot.

5. The switching device of claim 3, wherein the slot of the plate is recessed into a lateral edge of the plate; the plate has a protrusion which protrudes from the lateral edge of the plate, and is near the slot.

6. The switching device of claim 5, wherein the slot has an upper wall and a lower wall, which are provided on opposite sides; the protrusion is connected to the upper wall.

7. The switching device of claim 1, wherein the plug member has an axial hole, a first hole, and a second hole; the axial hole is located in an axial direction of the plug member; the first hole and the second hole both communicate with the axial hole, and are located in a radial direction of the plug member; a diameter of the first hole is greater than a diameter of the second hole.

8. The switching device of claim 7, wherein the plug member has a third hole which communicates with the axial hole, and is located in the radial direction of the plug member; a diameter of the third hole is smaller than the diameter of the second hole.

9. The switching device of claim 7, wherein a first guiding slot and a second guiding slot are recessed into an outer peripheral surface of the plug member; the first guiding slot extends from the first hole toward the second hole, and has a first end and a second end; the first end communicates with the first hole; the second end is near the second hole without physically communicating with the second hole; a width of the first guiding slot decreases gradually from the first end to the second end; the second guiding slot extends from the second hole toward the first hole, and has a third end and a fourth end; the third end communicates with the second hole; the fourth end is located between the first end and the second end of the first guiding slot without physically communicating with the first guiding slot.

10. The switching device of claim 9, wherein the second end of the first guiding slot is a tip.

* * * * *